United States Patent
Schmidt et al.

(10) Patent No.: US 10,607,045 B2
(45) Date of Patent: Mar. 31, 2020

(54) APPARATUS AND RESPECTIVE METHOD FOR COMMUNICATING WITH A TRANSPONDER AND SYSTEM FOR COMMUNICATING

(71) Applicant: Fraunhofer-Gesellschaft zur Foerderung der angewandten Forschung e.V., Munich (DE)

(72) Inventors: Philip Schmidt, Attendorn (DE); Gerd Vom Boegel, Wuelfrath (DE); Frederic Meyer, Erndtebrueck (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/803,467

(22) Filed: Nov. 3, 2017

(65) Prior Publication Data
US 2018/0129839 A1    May 10, 2018

(30) Foreign Application Priority Data
Nov. 4, 2016 (DE) .................. 10 2016 221 660

(51) Int. Cl.
| G06K 7/10 | (2006.01) |
| G06K 7/00 | (2006.01) |
| H04L 27/227 | (2006.01) |
| G01S 13/76 | (2006.01) |
| H04L 7/04 | (2006.01) |

(52) U.S. Cl.
CPC ....... *G06K 7/10346* (2013.01); *G06K 7/0008* (2013.01); *G06K 7/10118* (2013.01); *H04L 27/2273* (2013.01); *G01S 13/765* (2013.01); *H04L 7/042* (2013.01)

(58) Field of Classification Search
CPC ......... H03M 13/096; H04B 3/46; G06K 7/10; G06K 7/10009; G06K 7/10316; G06K 7/10346; G06K 9/03
See application file for complete search history.

(56) References Cited

U.S. PATENT DOCUMENTS

| 5,952,922 | A | * | 9/1999 | Shober | .................. | G01S 13/756 340/10.31 |
| 5,995,811 | A | * | 11/1999 | Watanabe | .............. | H04B 17/20 455/115.1 |
| 6,332,010 | B1 | * | 12/2001 | Lee | .................... | G11B 20/1403 375/368 |
| 6,501,807 | B1 | * | 12/2002 | Chieu | .................... | G01S 13/751 375/329 |
| 6,938,200 | B2 | * | 8/2005 | Pax | ........................ | G06K 7/0008 714/744 |

(Continued)

Primary Examiner — Carlos Garcia
(74) Attorney, Agent, or Firm — Perkins Coie LLP; Michael A. Glenn

(57) ABSTRACT

The invention relates to an apparatus for communicating with a transponder. The apparatus includes a transmit apparatus, a receive apparatus and an evaluation apparatus. The transmit apparatus transmits a transmit signal to the transponder. Based on a signal emitted by the transponder, the receive apparatus receives a receive signal. Based on the transmit signal and/or a signal portion, the evaluation apparatus evaluates the receive signal with respect to data errors. Further, the invention relates to a respective method as well as to a system for communicating.

15 Claims, 2 Drawing Sheets

(56) References Cited

U.S. PATENT DOCUMENTS

| | | | | |
|---|---|---|---|---|
| 7,010,730 | B1* | 3/2006 | Jaworski | H04L 12/2801 |
| | | | | 714/704 |
| 8,134,452 | B2* | 3/2012 | Tuttle | H04Q 9/00 |
| | | | | 340/10.1 |
| 8,578,221 | B1* | 11/2013 | Ikoma | H04L 1/203 |
| | | | | 714/707 |
| 9,032,268 | B1* | 5/2015 | Ryu | H04L 1/0041 |
| | | | | 714/759 |
| 9,760,745 | B2* | 9/2017 | Iida | H04L 7/04 |
| 2004/0027281 | A1* | 2/2004 | Akopian | G01S 19/24 |
| | | | | 342/387 |
| 2005/0232369 | A1* | 10/2005 | Friedrich | H04B 1/713 |
| | | | | 375/259 |
| 2006/0031671 | A1* | 2/2006 | Schmit | G08B 25/10 |
| | | | | 713/160 |
| 2006/0218468 | A1* | 9/2006 | Kuramoto | G06F 11/073 |
| | | | | 714/763 |
| 2006/0250972 | A1* | 11/2006 | Seebacher | H04L 43/50 |
| | | | | 370/242 |
| 2007/0028893 | A1* | 2/2007 | Hernandez | F02D 35/027 |
| | | | | 123/406.16 |
| 2008/0024281 | A1* | 1/2008 | Shimura | G06K 7/0008 |
| | | | | 340/10.3 |
| 2008/0069265 | A1* | 3/2008 | Ludvigsen | H04L 25/0228 |
| | | | | 375/295 |
| 2008/0231425 | A1* | 9/2008 | Sano | H03D 3/007 |
| | | | | 340/10.1 |
| 2011/0258669 | A1* | 10/2011 | Antia | H04N 7/20 |
| | | | | 725/67 |
| 2011/0317746 | A1* | 12/2011 | Aoki | H04B 7/155 |
| | | | | 375/213 |
| 2017/0111088 | A1* | 4/2017 | Seong | B60L 11/1829 |

* cited by examiner

APPARATUS AND RESPECTIVE METHOD FOR COMMUNICATING WITH A TRANSPONDER AND SYSTEM FOR COMMUNICATING

CROSS-REFERENCE TO RELATED APPLICATIONS

This application claims priority from German Patent Application No. 10 2016 221 660.0, which was filed on Nov. 4, 2016, and is incorporated herein in its entirety by reference.

The invention relates to an apparatus for communicating with a transponder as well as to a system for communicating. Further, the invention relates to a method for communicating with a transponder.

BACKGROUND OF THE INVENTION

If data are transmitted in a contactless and in particular in a wireless manner, e.g., via electromagnetic waves, interferences that can possibly even influence or change the transmitted data can be coupled in by noise or by crosstalk of other signals. For ensuring secure data transmission, it is known to transmit the data in a redundant manner, for example by transmitting, e.g., checksums together with the actual data. If the received data deviate from the checksum, obviously, an error has occurred during transmission. Here, the signals are transmitted from a transponder to a receiver or generally an apparatus for communicating with a transponder.

In conventional technology, it is known to provide objects with RFID transponders (RFID=radio frequency identification) or also RFID tags as an example of the above-stated transponders. RFID readers can read out identification data from the RFID transponders or data (for example measurement data) are transmitted from an object connected to the transponder (e.g., a measuring device or sensor) to the reader.

The more and more frequently used high-frequency RFID transponders of conventional technology are typically passive and are excited and activated, respectively, by a high-frequency electromagnetic field. Generally, these RFID transponders have only little energy or no individual energy resources at all. Thus, the transponder uses the transmit signal from the reader and transmits, in response to the excitation, a modulated signal back to the reader. In most cases, the modulated signal is a backscatter signal, so that the signal emitted by the transponder results from a modulation of the transmit signal of the reader received by the transponder with a data signal of the transponder. By means of the data signal, this response signal includes information from the transponder that can be evaluated by the reader.

Thus, data integrity, i.e., secure and error-free transmission of the data signal is to be ensured, if in RFID transponders, according to conventional technology, data originating from the transponder have to be transmitted in a redundant manner. However, the increased data volume is disadvantageous, in particular in the example of the RFID transponders having limited energy resources.

SUMMARY

According to an embodiment, an apparatus for communicating with a transponder may have a transmit apparatus, a receive apparatus and an evaluation apparatus, wherein the transmit apparatus is configured to emit a transmit signal to the transponder, wherein the receive apparatus is configured to receive a receive signal based on a signal emitted by the transponder, and wherein the evaluation apparatus is configured to evaluate the receive signal with respect to data errors based on the transmit signal and/or a signal portion.

According to another embodiment, a system for communicating may have an apparatus for communicating with a transponder and a transponder, wherein the apparatus includes a transmit apparatus, a receive apparatus and an evaluation apparatus, wherein the transmit apparatus is configured to emit a transmit signal to the transponder, wherein the receive apparatus is configured to receive a receive signal based on a signal emitted by the transponder, wherein the evaluation apparatus is configured to evaluate the receive signal with respect to data errors based on the transmit signal and/or a signal portion, wherein the transponder includes a transponder receive apparatus and a transponder transmit apparatus, wherein the transponder receive apparatus is configured to receive a signal from the apparatus, and wherein the transponder transmit apparatus is configured to emit a signal based on the received signal and the data signal to the apparatus.

Another embodiment may have a method for communicating with a transponder, wherein the transmit signal is emitted to the transponder, wherein a receive signal depending on a signal emitted by the transponder is received, and wherein the receive signal is evaluated with respect to data errors based on the transmit signal and/or a signal portion.

The invention solves the object by an apparatus for communicating (also unidirectional or bidirectional transmission of data) with a transponder. The apparatus comprises a transmit apparatus, a receive apparatus and an evaluation apparatus. The transmit apparatus is configured to emit a transmit signal to the transponder. The receive apparatus is configured to receive a receive signal based on a signal emitted by the transponder. Finally, the evaluation apparatus is configured to evaluate the receive signal with respect to data errors based on the transmit signal and/or a signal portion.

The apparatus emits a transmit signal that results, in one configuration, from two signal portions, to the transponder, i.e., in its direction and/or at a frequency that can be received by the transponder and/or with a transmit power sufficient for reaching the transponder. In one configuration, two signals are combined, e.g., modulated together for this.

The transmit signal is received by the transponder and is returned to the apparatus, e.g. by backscattering. In one configuration, the transponder modulates in particular the transmit signal, such that the same carries data, in particular a data signal, of the transponder. Subsequently, the signal of the transponder is received by the receive apparatus of the apparatus, after the same has passed the space between the apparatus and the transponder and after interferences or superpositions with other signals have possibly taken place.

Thereupon, an evaluation apparatus evaluates the receive signal based on the transmit signal and at least one signal portion (in one configuration, this relates to data allowing a description of the transmitted signal) of the transmit signal, respectively. In that the receive signal results from a modulation of the transmit signal with a data signal of the transponder in one configuration, the receive signal comprises the transmit signal at least partly in one configuration.

Thus, in one configuration, the evaluation apparatus determines whether any deviations with respect to the transmit signal and to one of the signal portions—at least two in one configuration—of the transmit signal, respectively, exist in the receive signal. If, for example, the receive signal would have to carry a signal portion of the transmit signal, but differences as regards to shape, frequency or wave form in general occur (e.g., due to interruptions), this means that the signal from the transponder to the apparatus has been damaged and that the data signal extracted from the receive signal can be erroneous. Thus, when evaluating the receive signal, the transmit signal enables the detection of data errors in the receive signal. Thus, it can be detected whether the transmission of the data had been erroneous. Thus, the evaluation apparatus is configured to determine, based on the transmit signal and a signal portion of the transmit signal, respectively, whether a data signal of the transmitter had been transmitted correctly or whether interferences can be detected.

According to one configuration, the transmit signal comprises two different signal portions.

In one configuration, communication is carried out in particular with a transponder that emits signals according to the backscatter principle. Thus, coupling by modulated backscattering exists between the apparatus and the transponder.

According to one configuration, the signal emitted by the transponder is based on the transmit signal and a data signal of the transponder.

In one configuration, the receive signal is based on the fact that the transponder modulates a data signal onto the transmit signal received by the same.

The following configurations relate to the transmit signal and the two signal portions which result in the transmit signal according to one configuration.

In one configuration, it is provided that the signal portions originate from two independent signal sources. Thus, one configuration provides that the apparatus comprises two such signal sources.

In one configuration, a first signal portion is implemented as carrier. Additionally or alternatively, in one configuration, a second signal portion is configured such that the same serves for carrier suppression.

In a further configuration, it is intended that data, in particular in the form of a data signal, are modulated onto a first signal portion.

One configuration is that a first signal portion is configured as amplitude-modulated signal. This has the advantage that demodulation of an amplitude-modulated signal can be realized on the transponder side in a very good and energy-efficient manner.

According to one configuration, a first signal portion can consists of a temporarily repeating information sequence. In an additional or alternative configuration, a second signal portion can serve synchronization purposes.

According to a configuration, the second signal portion serves for the transmission of information for controlling carrier suppression.

In one configuration, it is intended that a second signal portion is configured as phase-modulated or frequency-modulated signal or is configured as a signal according to orthogonal frequency-division multiplexing (OFDM).

According to a configuration, a signal portion of the transmit signal which, in one configuration, does in particular not transmit any data to the transponder is phase-modulated. Phase modulation has the advantage that synchronization of the receive signal with the transmit signal and the second signal portion, respectively, can be realized via the phase. This reduces computing power, for example compared to frequency modulation.

In one configuration, the transmit signal emitted by the apparatus having the transmit apparatus (possible designations for the apparatus are generally also base station or reader), in particular to the transponder, consists of two parts: in one configuration this is, on the one hand, an amplitude-modulated part (and transmit part, respectively) that transmits data in the direction of the transponder. On the other hand, this is a phase-modulated part (and signal portion, respectively) that is not relevant for the transponder and also carries no data for the transponder but that is used for carrier suppression after backscatter modulation of the transmit signal in the base station (i.e., the apparatus for communicating).

One configuration is that the signal portions of the transmit signal have the same data rate or different data rates.

In one configuration, it is intended that the signal portions are incoherent.

One configuration includes that the evaluation apparatus is configured to provide a data signal of the transponder based on the receive signal. In this configuration, the evaluation apparatus extracts a data signal of the transponder from a receive signal, e.g., by demodulation by using the transmit signal.

According to a configuration, synchronization of transmit signal and receive signal is performed without demodulation of the two signals.

In one configuration, it is intended that the data rate of the transmit signal is predetermined such that the data rate of the transmit signal is greater than a data rate of a data signal of the transponder that is to be expected in one configuration. If the transmit signal comprises two signal portions, the transmit signal will also have two different data rates in one configuration.

If the transmit signal comprises two signal portions (here referred to as first and second signal portions, respectively), one configuration provides that a data rate of a second signal portion of the transmit signal is predetermined such that the data rate of the second signal portion is greater than a data rate of a data signal of the transponder.

Thus, in this configuration, the data rate of a data signal of the transponder is lower than the data rate of the transmit signal. By predetermining the data rates, it is quasi determined that the data signal having a lower data frequency is superposed by a signal, namely the transmit signal or a signal portion of the transmit signal, having a higher data frequency in the frequency domain. In other words, the transmit signal and a signal portion of the transmit signal, respectively, is "mounted" on the data signal of the transponder in the frequency domain.

According to one configuration, the evaluation apparatus is configured to synchronize the receive signal with a synchronization signal.

Here, in one configuration, the synchronization signal is predetermined based on the transmit signal and in one configuration the same can be identical to the transmit signal.

In a further configuration, the evaluation apparatus is configured to synchronize the receive signal for demodulation with regard to frequency and/or phase.

In one configuration, the transmit apparatus is configured to emit the transmit signal multiples times and/or across a predetermined transmit time period. This configuration enables, in particular in a RFID transponder, constant energy supply of the same. Further, this configuration has the effect that the transmit signal of the apparatus interacts with the signal emitted by the transponder, such that superposition on the transmission path results. The transmit time period and the time across which multiple emission of the transmit signal extends, respectively, is, in one configuration, so long that the transmit signal can influence and possibly superimpose the signal transmitted by the transponder, i.e. in one configuration the modulated backscatter signal.

In one configuration, the apparatus enables multi-receiver capability, since no limitation exists in point-to-multipoint transmission (broadcast method). Thus, in one configuration, by announcing the selected encoding to specific receivers and transponders, groups are formed that are enabled to receive the transmit signal of the apparatus. This results in a simple selection of desired transponders from a greater number of existing receivers. This is also based on the fact that a signal portion of the transmit signal can serve as key.

According to one configuration, the apparatus is configured as RFID reader and the transponder is an RFID transponder.

Further, the invention relates to a transponder that receives signals, modulates a data signal and emits the received signal modulated with the data signal again. Here, in particular, backscatter modulation takes place. The signal transmitted by the transponder can generally also be referred to as response signal of the transponder.

Further, the invention solves the object by a system for communicating. Here, communicating relates in particular to the communication between an apparatus for communication (as described, for example, exemplarily in the above configurations) and a transponder.

The system for communicating comprises an apparatus for communicating with a transponder (in one configuration, the apparatus is an RFID reader) and such a transponder (for example an RFID transponder).

The apparatus comprises a transmit apparatus, a receive apparatus and an evaluation apparatus. The transmit apparatus is configured to emit a transmit signal to the transponder. The receive apparatus is configured to receive a receive signal based on a signal emitted by the transponder. Finally, the evaluation apparatus is configured to evaluate the receive signal with respect to data errors based on the transmit signal and/or a signal portion.

The transponder comprises a transponder receive apparatus and a transponder transmit apparatus. The transponder receive apparatus is configured to receive a signal from the above-stated apparatus. The transponder transmit apparatus is configured to emit a signal based on the received signal and on a data signal to the apparatus, quasi as response signal.

In this system, the apparatus transmits a transmit signal by its transmit apparatus, which is received by the transponder by its transponder receive apparatus. With its transponder transmit apparatus, the transponder transmits a (response) signal to the apparatus which is based on the received signal, i.e. the received transmit signal of the apparatus and a data signal. Thereupon, the apparatus receives a receive signal with its receive apparatus that is based on the signal emitted by the transponder and evaluates the same with respect to data errors. Thus, the apparatus examines whether the signal transmitted by the transponder has arrived in an error-free manner. The transmit signal and at least one signal portion of the transmit signal, respectively, is used for the evaluation.

According to an optional configuration, the transmit signal comprises at least two signal portions. In an alternative configuration, the transmit signal does not have several signal portions. In one configuration, the transmit signal is exclusively phase-modulated. In this case, no data transmission in the direction of the transponder takes place due to the non-existing amplitude-modulated portion. Thus, the transponder can be configured in a simpler way, such that, e.g. no receive apparatus exists.

The apparatus for communicating with the transponder is implemented according to one of the above configurations, such that the above explanations also apply for the system. The same applies vice-versa.

In one configuration, the transponder is configured such that the signal emitted by the transponder is based on a modulation of the transmit signal with a data signal of the transponder. Here, the transponder performs a so-called backscatter modulation of the signal received by the same (i.e. the transmit signal of the apparatus for communication).

In one configuration, a data rate of the transmit signal is predetermined to be greater than a data rate of the data signal of the transponder. Here, in one configuration, a high-frequency transmit signal can be modulated with a low-frequency data signal.

According to one configuration, the transmit apparatus is configured to emit the transmit signal multiple times and/or across a predetermined transmit time period. By the continuous or repeated emission of the transmit signal, it is possible that the signal emitted by the transponder is superposed by the transmit signal.

In one configuration, an analog carrier suppression method is used.

According to one configuration, the apparatus is configured as an RFID reader and the transponder is an RFID transponder.

Further, the invention solves the object by a method allowing communication with a transponder. In one configuration, communication relates to the fact that the transponder receives data. In a further and purely optional configuration, data are also transmitted to the transponder.

The method comprises at least the following steps:
a transmit signal is emitted to the transponder,
a receive signal depending on a signal emitted by the transponder is received, and
based on the transmit signal and/or signal portion, the receive signal is evaluated with respect to data errors.

In some configurations, the following results:
The transponder still receives the transmit signal. Additionally, the transponder emits a signal that is based on the signal received by the transponder and a data signal. The receive signal is based on the signal transmitted by the transponder and interferences possibly occurring on the transmission path of the radio signals.

The above configurations of the apparatus for communication can accordingly also be implemented by the method, such that the above statements also apply accordingly for the method.

In detail, there are a plurality of options for configuring and developing the inventive apparatus, the system and the method further. In this regard, reference is made to the claims on the one hand and to the following description of embodiments in connection with the drawings on the other hand.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
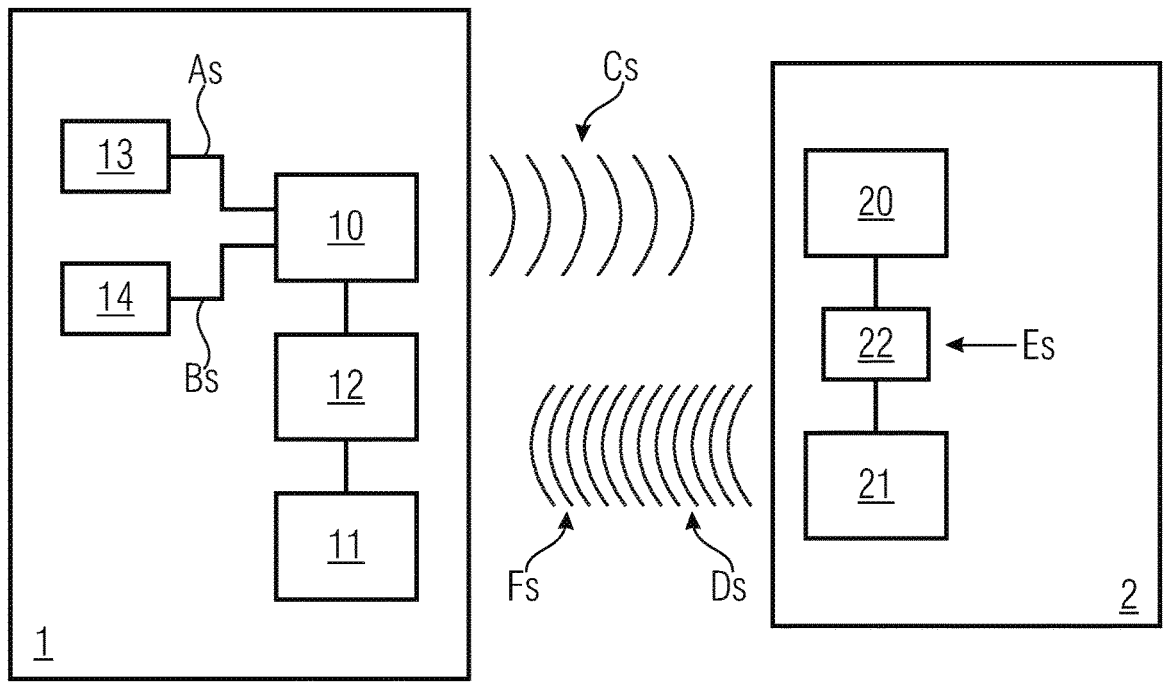
FIG. 1 is a schematic illustration of a system having an apparatus for communication and a transponder.

The apparatus 1 for wireless and radio-based communication with a transponder and the transponder 2 form a system for communication between the apparatus 1 and the transponder 2.

The apparatus 1 comprises a transmit apparatus 10 for emitting a transmit signal Cs in the direction of the transponder 2. For the transmit signal Cs, the transmit apparatus 10 is connected to two different signal sources 13, 14 each providing a first signal portion As and a second signal portion Bs, respectively. In an exemplary configuration, the second signal portion Bs allows the transmission of data from the apparatus 1—alternative terms are, for example, depending on the configuration, base station or reader—to the transponder 2. In a different configuration, no data are transmitted, such that, for example, no multi-part transmit signal Cs exists.

Thus, the transmit signal Cs comprises two different signal portions As, Bs, such that the transmit signal Cs can also be written as the sum of the two signal portions As, Bs: Cs=As+Bs. However, the two signal portions relate merely to a possible embodiment. In an alternative embodiment, the transmit signal is a phase-modulated signal comprising only one signal portion.

For the transponder 2 to be supplied with sufficient energy in the shown configuration, the transmit signal Cs is continuously emitted.

Further, the apparatus 1 comprises a receive apparatus 11 for receiving signals that have been emitted by the transponder 2. The received receive signal Fs depending on a signal Ds emitted by the transponder 2 but possibly also from foreign radiations or also crosstalk of the transmit signal Cs is processed by the evaluation apparatus. Depending on the configuration, the evaluation apparatus 12 uses the transmit signal Cs or one of the two signal portions As, Bs for evaluating the receive signal Fs.

The transponder 2 receives the transmit signal Cs with the transponder receive apparatus 20 and thereby receives also the energy of the same in the shown example. The received transmit signal Cs is supplied to a modulator 22 which modulates the same with a data signal Es and hence generates the signal Ds that is emitted by the transponder transmit apparatus 21 to the apparatus 1. The data signal Es is supplied to the modulator 22 and relates, for example, to identification data or measurement data.

Thus, the signal Ds to be transmitted by the transponder 2 is a result of the modulation of the transmit signal Cs with the data signal Es of the transponder 2, such that the signal to be transmitted Ds can be written as product of the transmit signal Cs and the data signal referred to by Es: Ds=Es*Cs.

The receive signal Fs depends on the signal Ds emitted by the transponder 2. Further, the receive signal Fs is possibly dependent on crosstalk of the transmit signal Cs, such that the receive signal Fs can also be described as a sum of signals: Fs=Ds+Cs.

The (response) signal transmitted by the transponder 2, that has been generated from the transmit signal Cs of the apparatus can also be formulated as follows: Fs=Es*Cs+Cs.

Thus, in the normal case, the receive signal Fs comprises the transmit signal Cs. In a further configuration, the receive signal Fs includes at least one signal portion (As, Bs) of the transmit signal Cs.

Thus, the evaluation apparatus 12 is configured such that the same evaluates the receive signal Fs with regard to whether deviations to the transmit signal Cs and the at least one signal portion As, Bs, respectively, can be found. Thus, in one configuration, the receive signal Fs is synchronized with a synchronization signal Gs, wherein in one configuration the synchronization signal Gs is equal to the transmit signal Cs. Thus, in the latter configuration, the receive signal Fs is synchronized with the transmit signal Cs.

Additionally, the evaluation apparatus 12 extracts the data signal Es of the transponder 2 from the receive signal Fs, e.g. by demodulation.

All in all, the evaluation apparatus 12 provides the data signal Es of the transponder 2 as well as information on the data integrity as a consequence of the wireless data communication.

Figure 2:
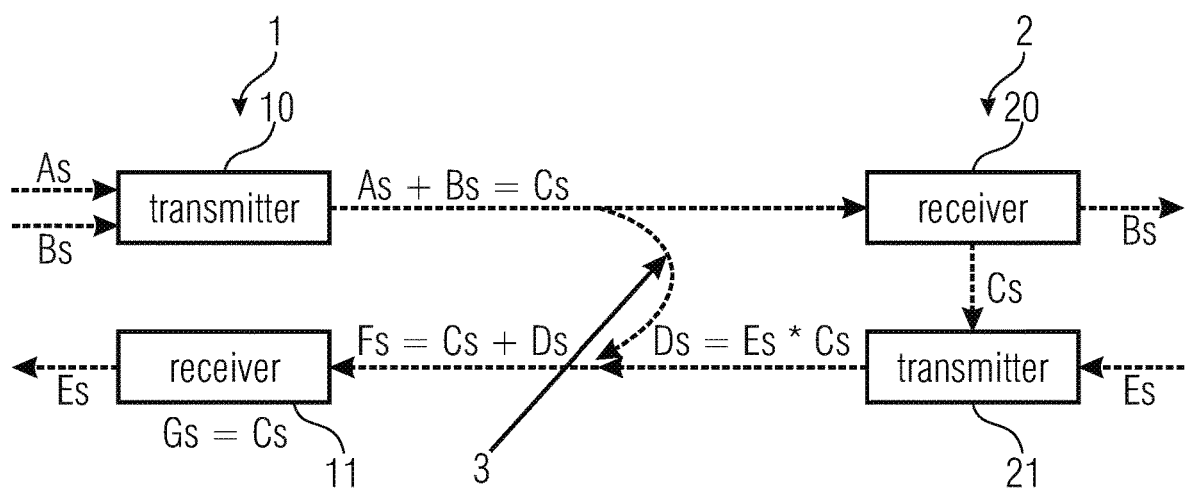
FIG. 2 is a schematic illustration of a further system and FIG. 3 is a schematic wave form of a signal received by the apparatus.

FIG. 2 shows again a system that is based on the backscatter modulation principle.

Here, the apparatus for communication 1 is configured as reader and comprises a transmit apparatus 10, here referred to as transmitter. This transmitter 10 receives the two independent signal portions As and Bs and emits the transmit signal Cs which consists of the two signal portions As and Bs. This is illustrated by the formula: As+Bs=Cs. However, the formula relates only to the illustrated exemplary configuration. Discovering errors during transmission is possible independent of the fact whether the transmit signal Cs consists of one or several parts.

In one configuration, the two signal portions As, Bs originate from two different and independent signal sources and are mixed with one another according to an arbitrarily predetermined modulation type. In one configuration, the first signal portion As represents the carrier onto which in a further configuration data are modulated for transmission to the transponder 2. In one configuration, the second signal portion Bs is an arbitrary signal that is used for carrier suppression in one configuration.

The transmitter 10 transmits the transmit signal Cs to the transponder receive apparatus 20 of the transponder 2. Here, the transponder receive apparatus 20 is referred to as receiver.

Here, transmit apparatus 10 and the transponder receive apparatus 20 are connected to one another via an air interface across which the signals are transmitted.

Here, the transponder receive apparatus 20 is further configured such that the same extracts a signal portion, here the second signal portion Bs, from the received transmit signal Cs and passes the same on to further components of the transponder 2 that are not illustrated here.

The received transmit signal Cs reaches the transponder transmit apparatus 21 from the receiver 20 of the transponder 2. Here, the transponder transmit apparatus 21 is referred to as transmitter and includes a backscatter modulator that modulates the received transmit signal Cs with a data signal Es of the transponder 2 and thereby generates the signal Ds which the transponder 2 emits as response signal. Here, this response signal Ds is described as multiplication of the data signal Es with the received transmit signal Cs: Ds=Es*Cs.

The transmitter 21 of the transponder 2 transmits the response signal Ds to the receive apparatus 11 of the apparatus 1. Here, the receive apparatus 11 is referred to as receiver.

For supplying the transponder 2 with sufficient energy, in the shown configuration, the apparatus 1 emits the transmit signal Cs repeatedly and across a longer time period, respectively. This results in crosstalk 3 of the transmit signal Cs on the response signal Ds of the transponder 2 along the air interface.

Thus, the receive signal Fs received by the receiver 11 of the apparatus 1 results as a sum of the response signal Ds and the transmit signal Cs: Fs=Cs+Ds.

However, interferences by which the receive signal Fs differs from the response signal Ds can still occur.

In a further configuration, no continuous emission or repeated emission of the transmit signal Cs takes place, such that the mentioned crosstalk 3 does not occur and the receive signal Fs results directly from the signal Ds transmitted by the transponder 2 and possible interferences, respectively.

For detecting such errors or interferences, the receive apparatus 11 is configured such that the same includes the evaluation apparatus.

First, in the shown configuration, the receive signal Fs is synchronized with regard to frequency and phases for achieving the best possible demodulation. Subsequently, the synchronized receive signal Fs is synchronized with a synchronization signal Gs that is equal to the transmit signal Cs (illustrated by Gs=Cs). Further, the receiver 11 also provides the data signal Es of the transponder 2, e.g. by a backscatter demodulator.

Thus, in the shown configuration, the receiver 11 of the apparatus 1 determines, based on the transmit signal Cs, whether the receive signal Fs comprises errors.

Figure 3:
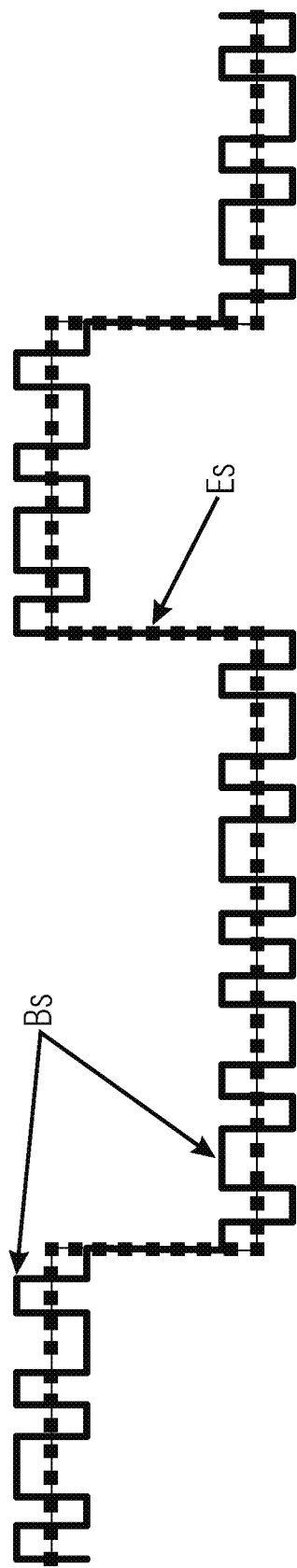

FIG. 3 shows a wave form of a data signal Es (dotted line) and a second signal portion Bs (continuous thinner line) that is part of, e.g., a receive signal. Here, the data signal Es has a significantly lower frequency than the second signal portion Bs, such that the bits of the second signal portion Bs are mounted on the wave form of the data signal Es.

Thus, when comparing a receive signal Fs, which comprises the second signal portion Bs and the data signal Es as components, to the second signal portion Bs that has been used for generating the transmit signal Cs, it can be inferred, when the second signal portion Bs extracted from the receive signal Fs deviates from the original second signal portion Bs, that the response signal Ds emitted by the transponder has been interfered with, such that the integrity of the data signal Es is also in question.

Here, detecting errors is in particular possible without transmitting the data of the transponder and the data signal, respectively, in a redundant manner. Thus, the energy requirements of the transponder are reduced and the range between the transponder (e.g. an RFID transponder) and the apparatus for communication 1 (e.g. an RFID reader) is extended.

In further configurations, additional redundancies are added to the raw data streams of data sources A, Bs and Es.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for communicating with a transponder, wherein the apparatus comprises a transmit apparatus, a receive apparatus and an evaluation apparatus, wherein the transmit apparatus is configured to emit a transmit signal including a first and a second independent signal portions to the transponder, wherein the first and the second signal portions comprise different modulation types, wherein the receive apparatus is configured to receive a receive signal based on a signal emitted by the transponder, and wherein the evaluation apparatus is configured to evaluate the receive signal with respect to data errors using the transmit signal and/or one of the first and second signal portions of the transmit signal, by comparing the received signal to the one of the first and the second signal portions of the transmitted signal.

2. The apparatus according to claim 1, wherein the signal emitted by the transponder is based on the transmit signal and a data signal of the transponder.

3. The apparatus according to claim 2, wherein the signal emitted by the transponder is multiplication of the transmit signal and the data signal of the transponder.

4. The apparatus according to claim 1, wherein the signal portions originate from two different signal sources.

5. The apparatus according to claim 4, wherein the first signal portion is configured as amplitude-modulated signal, and the second signal portion is configured as phase-modulated or frequency-modulated or a signal according to orthogonal frequency-division multiplexing.

6. The apparatus according to claim 1, wherein the evaluation apparatus is configured to provide a data signal of the transponder based on the receive signal.

7. The apparatus according to claim 1, wherein a data rate of the transmit signal is predetermined such that the data rate of the transmit signal is greater than a data rate of a data signal of the transponder.

8. The apparatus according to claim 1, wherein the evaluation apparatus is configured to synchronize the receive signal with a synchronization signal and wherein the synchronization signal is predetermined based on the transmit signal.

9. The apparatus according to claim 1, wherein the transmit apparatus is configured to emit the transmit signal multiple times and/or across a predetermined transmit time period.

10. The apparatus according to claim 1, wherein the apparatus is configured as RFID reader, and wherein the transponder is an RFID transponder.

11. A system for communicating, wherein the system comprises an apparatus for communicating with a transponder, wherein the apparatus comprises a transmit apparatus, a receive apparatus and an evaluation apparatus, wherein the transmit apparatus is configured to emit a transmit signal including a first and a second independent signal portions to the transponder, wherein the first and the second signal portions comprise different modulation types, wherein the receive apparatus is configured to receive a receive signal based on a signal emitted by the transponder, wherein the evaluation apparatus is configured to evaluate the receive signal with respect to data errors using the transmit signal and/or one of the first and second signal portions of the transmit signal, by comparing the received signal to the one of the first and the second signal portions of the transmitted signal, wherein the transponder comprises a transponder receive apparatus and a transponder transmit apparatus, wherein the transponder receive apparatus is configured to receive a signal from the apparatus, and wherein the transponder transmit apparatus is configured to emit a signal based on the received signal and a data signal to the apparatus.

12. The system according to claim 11, wherein the transponder is configured such that the signal emitted by the transponder is based on a modulation of the transmit signal with a data signal of the transponder.

13. The system according to claim 11, wherein a data rate of the transmit signal is predetermined such that the data rate of the transmit signal is greater than a data rate of a data signal of the transponder.

14. A method for communicating with a transponder, comprising steps of;
emitting a transmit signal including a first and a second independent signal portions to the transponder, wherein the first and the second signal portions comprise different modulation types,
receiving a receive signal depending on a signal emitted by the transponder, and
evaluating the receive signal with respect to data errors using the transmit signal and/or one of the first and the second signal portions of the transmit signal, by comparing the received signal to the one of the first and the second signal portions of the transmitted signal.

15. The method according to claim 14, wherein the method further comprises a step of;
controlling a data rate of the transmit signal which is predetermined such that the data rate of the transmit signal is greater than a data rate of a data signal of the transponder.

* * * * *